United States Patent

Wallace

[15] 3,680,757
[45] Aug. 1, 1972

[54] CONVEYOR MECHANISM FOR SAUSAGE-LIKE PRODUCTS

[72] Inventor: William R. J. Wallace, Montreal, Quebec, Canada

[73] Assignee: Hygrade Foods Inc., Montreal, Quebec, Canada

[22] Filed: Sept. 23, 1970

[21] Appl. No.: 74,707

[52] U.S. Cl. ................................................226/105
[51] Int. Cl. ............................................B65h 33/00
[58] Field of Search..............226/104, 105, 108, 115

[56] References Cited

UNITED STATES PATENTS 3,430,831  3/1969  Burton..........................226/105
3,552,620  1/1971  Neubeck........................226/105

*Primary Examiner*—Richard A. Schacher
*Attorney*—Peter Kirby, Charles P. Curphey and Norris M. Eades

[57] ABSTRACT

The loading of continuous chains of sausage products into festooned loops on a T-bar conveyor for transportation through a cooker, as illustrated in U.S. Pat. No. 3,505,081 issued Apr. 7, 1970, is rendered less dependent on accurate alignment of the conveyor bars by the use of a tugger device that pulls each T-bar forward of its normal position on the conveyor during paying out of lengths of the sausage chains to form loops between the T-bars.

2 Claims, 11 Drawing Figures

3,680,757

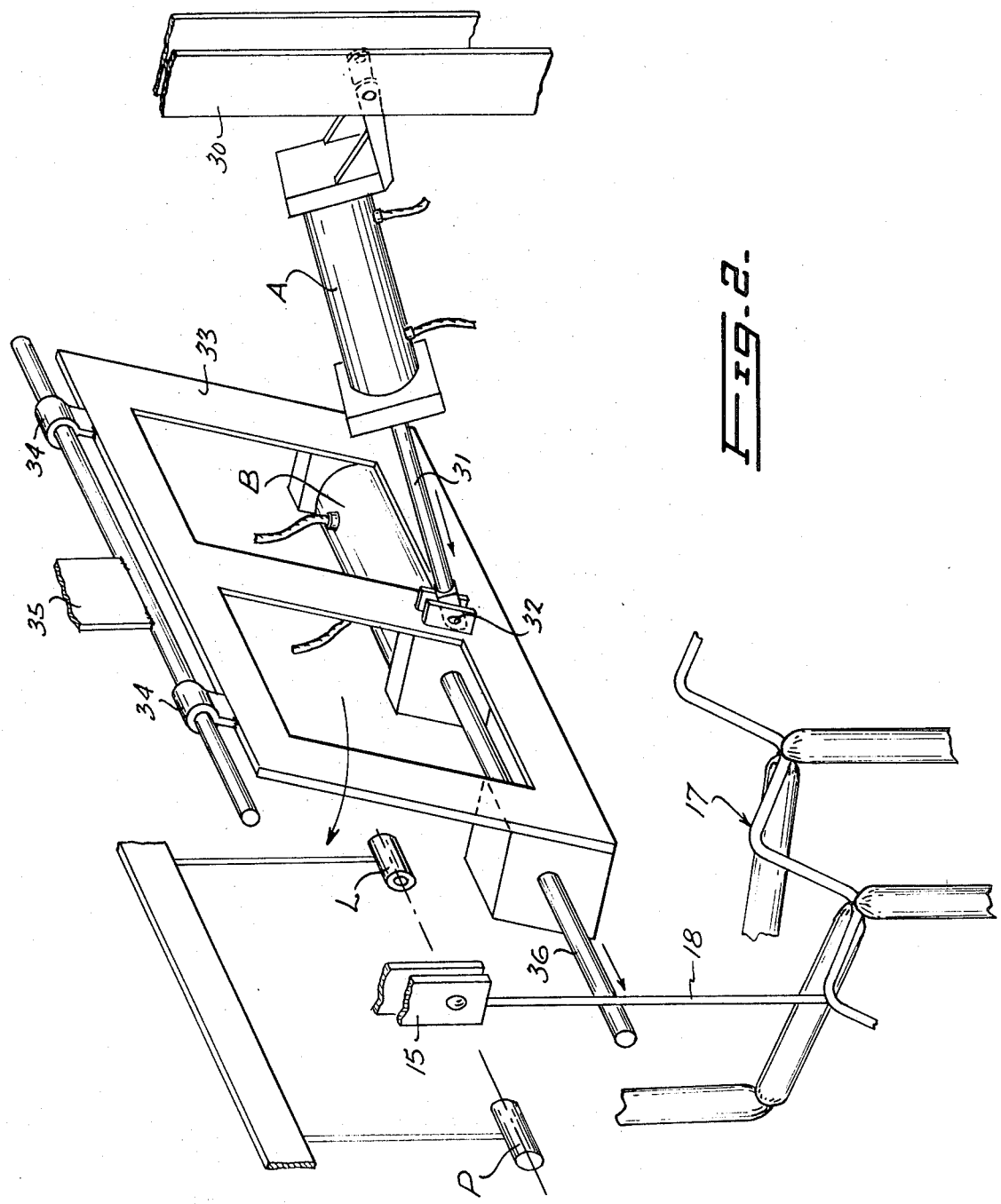

CORRECT OPERATION

MALFUNCTION

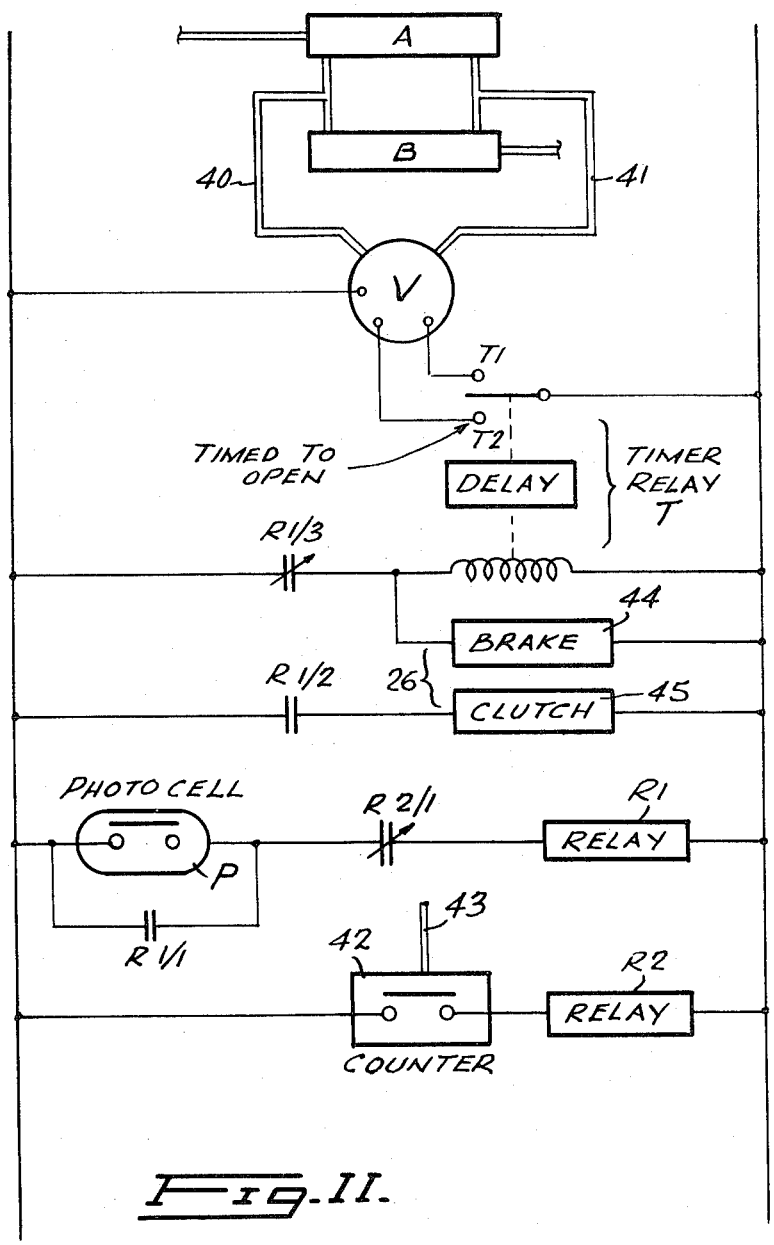
Fig. II.

CONVEYOR MECHANISM FOR SAUSAGE-LIKE PRODUCTS

REFERENCE

U.S. Pat. No. 3,505,081 issued Apr. 7, 1970 to W. R. J. Wallace.

INTRODUCTION

This invention relates to a conveyor mechanism employed in the transportation for processing purposes of chains of Weiners, Frankfurters and other like edible sausage products, hereinafter referred to for convenience either as "sausage products," or simply "sausages."

In my U.S. Pat. No. 3,505,081 issued Apr. 7, 1970 (Canadian Pat. Nos. 781,416 and 780,814 issued Mar. 26 and Mar. 19, 1968, respectively), there is described a machine that includes a conveyor for the transportation of chains of sausage products through equipment for cooking meat therein and/or for subjecting the products to such other treatments as may be required, e.g. smoking or final chilling.

A common method of manufacturing such products is first to stuff a continuous tube of casing material with meat emulsion. The casing is then constricted at intervals, to divide the tube into the required individual lengths, e.g. 5 to 6 inches, each length forming an individual sausage. This division of the casing into individual lengths may either be carried out manually or by a machine. Some machines tie the casing with thread to form each constriction. In recent years the preferred manner of forming the constrictions has been to twist the casing, a method that has much to recommend it in terms of speed of operation. However, it has the inherent difficulty that the chain of sausage products so formed must be held firmly, or it will simply unwind. For example, if such a chain were allowed to hang vertically supported only at its upper end, the twisted constrictions or "links" between individual sausages would immediately untwist and the identity of the individual sausages would be lost, the chain becoming a single long casing loosely filled with meat emulsion.

After such a twisted sausage chain has been subjected to a cooking process, the tendency to unwind will have substantially or completely disappeared. However, before this stage it is necessary to handle the chains as they emerge from the sausage making machine and to convey them in an orderly fashion to the cooking ovens. It is during this time that it is important to take steps to resist the natural tendency of the chain to unwind.

In my prior patent referred to above a method is disclosed in which each sausage is subjected to a transverse squeezing action to stress the casing material at the ends of the sausages, i.e. in the vicinity of the twisted links, the force applied by this squeezing action being sufficient to stress the casing material beyond its elastic limit, thus converting some of the stress therein to strain. The permanent setting of the material that results tends to reduce the tendency of the links to unwind and thus makes the sausage chain more manageable. It does not, however, entirely eliminate some residual tendency of the links to untwist; consequently some care must still be exercised in the handling of the chain prior to the final relief of all stress by the cooking step.

After forming the twisted constrictions in the chain and squeezing the individual sausage products as explained above, it is necessary to convey the chains slowly through the cooking i.e. and for practical reasons of space the chains are festooned in a series of hanging loops for this operation. It is during this conveying stage that further steps may be necessary to inhibit the tendency of the loops to become twisted upon themselves as a result of any residual stresses in the individual links.

It has been found that the most convenient way of conveying festooned chains of sausage products through a cooking oven is by means of a T-bar conveyor, i.e. a conveyor having a fixed rail along which a series of hangers are pulled, each hanger carrying a depending, inverted T-bar having a pair of oppositely extending horizontal arms that are corrugated to form notches in each of which there engages a link between a pair of sausages of the chains, the latter being festooned in successive loops between each pair of adjacent T-bars. Once the chains of sausage products have been properly loaded onto such a T-bar conveyor they can be transported through a cooking oven or other treatment equipment without the residual twisting tendency giving arise to significant difficulty. To ensure this, however, it is important that the loading of the sausage chains onto the T-bars be carried out accurately and reliably, and particularly that the desired number of sausages always appears in each loop; otherwise difficulties can arise downstream of the loading station. More specifically, it is required that an odd number of sausages appears in each loop (for example nine or eleven) to ensure the existence of a horizontally extending sausage at the bottom of each loop. This bottom sausage tends to keep the two vertical portions of each loop spaced apart from each other and to prevent these vertical portions twisting tightly around each other. When the sausage chains festooned on the T-bar conveyor pass into the cooker it is important for reasons of uniformity of cooking that air be able to circulate freely between the individual sausages of each loop and each chain. Avoidance of intertwining of the loop portions also helps to eliminate "touch marks," these being blemishes that arise when the products are in contact with each other during the cooking process.

The primary object of the present invention is to provide an improved mechanism for ensuring reliable and accurate loading of sausage product chains onto a T-bar conveyor for transportation into a cooking oven and beyond.

SPECIFIC DESCRIPTION OF DRAWINGS

One example of apparatus constructed in accordance with the present invention is illustrated diagrammatically in the accompanying drawings, it being understood that these drawings are provided by way of example only, and not by way of limitation of the broad scope of the present invention, which latter is defined in the appended claims.

In the drawings:

FIG. 2 is a larger scale, fragmentary view, showing an improvement in such a machine according to the present invention;

FIG. 11 is a circuit diagram.

PRIOR ART MACHINE (FIG. 1)

Figure 1:
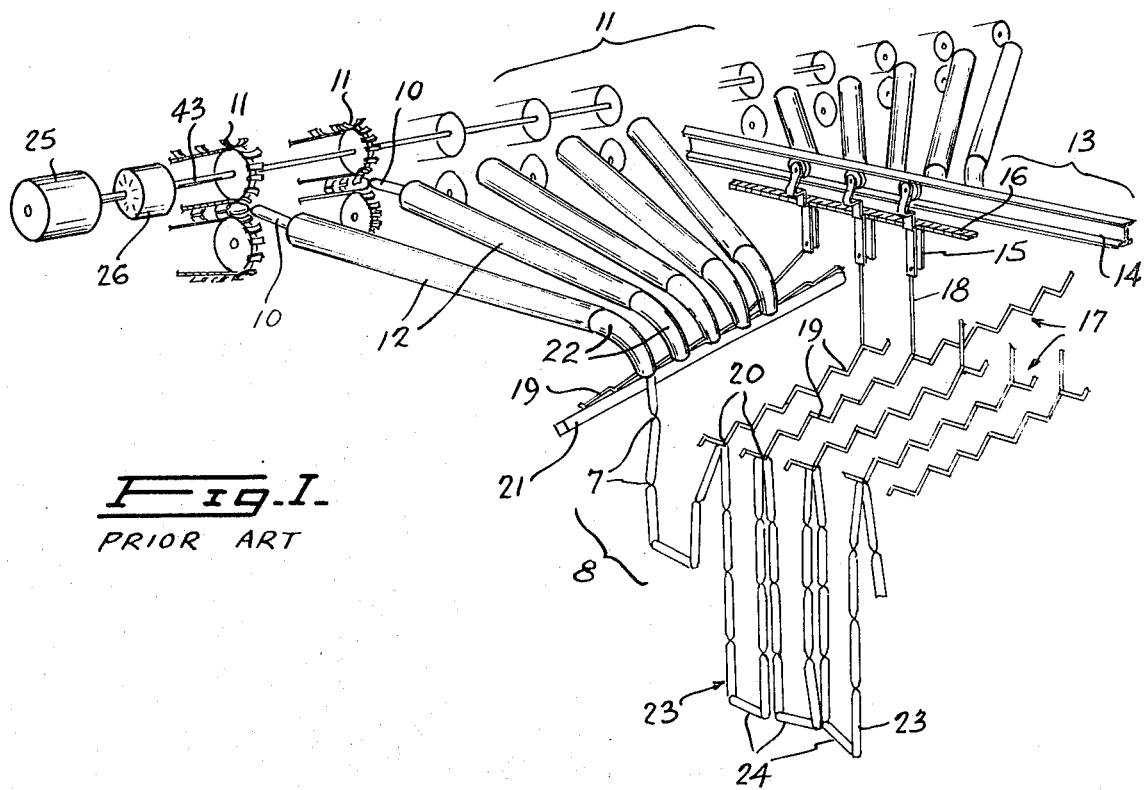
FIG. 1 is a perspective side view of a portion of a prior art machine, illustrating the general use of a T-bar conveyor.

In the machine of FIG. 1, chains 10 of sausage products are delivered from conveyors 11 and tubes 12 to a loading station 8. The chains 10 have been formed in an area (not shown) located upstream of the conveyors 11, the constricted links 7 between individual sausages having been formed by twisting, and some of their tendency to untwist having been eliminated by the squeezing process referred to above and also not shown in the present drawings. The links 7 will also have been brought into register with lugs on an upstream conveyor (not shown) to ensure that their location is predetermined in relation to travel of the conveyors generally, as will be more fully explained below, and that all the parallel chains of sausage products disposed across the machine are in alignment with each other in this regard, i.e. their links 7 are aligned.

The sausage chains 10 are conveyed through the tubes 12 having nozzles 22 to the loading station 8 and onto a continuously driven T-bar conveyor 13 which comprises a fixed conveyor rail 14 along which a series of hangers 15 travel, these hangers being pulled along by a chain 16 and the direction of travel being from left to right in FIG. 1. Each hanger 15 pivotally supports a supporting device in the form of a T-bar 17 comprising a vertical member 18 and a double-armed horizontal member 19 which is corrugated to provide ten notches 20 in each of which a link 7 engages. For simplicity of illustration in FIG. 1, only the nearest sausage chain 10 has been shown; it will, however, be appreciated that ten or any other convenient number of such sausage chains will be located side-by-side across the full width of the machine for simultaneous loading onto the T-bar conveyor at the loading station 8.

A fixed transverse bar 21 momentarily holds back the horizontal member 19 of each T-bar 17 until progress of the conveyor finally draws such member beyond the top of the bar 21, whereupon it falls into a vertical orientation at the loading station 8 beneath the downwardly projecting nozzles 22 of the tubes 12. Thus, as each T-bar 17 passes over the fixed bar 21 and falls into place below a row of nozzles 22, such movement should cause each of its notches 20 to engage a link 7 of a respective depending sausage chain 10.

The apparatus so far described in relation to FIG. 1 is essentially prior art and was described in my prior patent referred to above, the present invention being concerned with improvements therein.

Accurate indexing of the links 7 with the notches 20 is important, primarily in order to ensure the correct number of sausages in each loop 23, e.g. nine sausages, and hence the existence of a horizontal sausage 24 at the bottom of each loop.

While the prior apparatus has worked satisfactorily under many conditions, there are other conditions under which there is need for improvement in respect of the certainty of registration of the links 7 with the notches 20. This need arises especially in cases where the T-bars become bent or distorted due to the rigours of continuous use, when they cannot always be relied upon in practice to align themselves with the ideal parallelism shown in FIG. 1.

APPARATUS OF THE PRESENT INVENTION (FIGS. 2 TO 5)

The mechanism that forms the subject of the present invention is designed to increase the certainty of this registration, an example of such a mechanism being shown in FIGS. 2 to 5 and comprising a tugger device in the form of a pneumatic cylinder A pivotally connected at one end to a fixed frame member 30. The piston 31 of the cylinder A is connected through a pivotal connection 32 to a carrier 33 that is hinged at 34 to a further fixed frame member 35. Mounted on the carrier 33 is a second pneumatic cylinder B, the piston rod 36 of which can be extended into the path of travel of the vertical members 18 of each T-bar 17, as more fully explained below.

Cylinders A and B are pneumatically connected in parallel, but in the reverse sense (see also FIG. 10), that is to say such that the piston 31 of cylinder A is extended when the piston 36 of cylinder B is retracted, and vice-versa. In addition, the cylinder B is arranged to be fast acting in response to applied pressure, whereas the cylinder A is designed with a short built-in delay, thus ensuring that cylinder B always operates slightly in advance of cylinder A.

Figure 3:
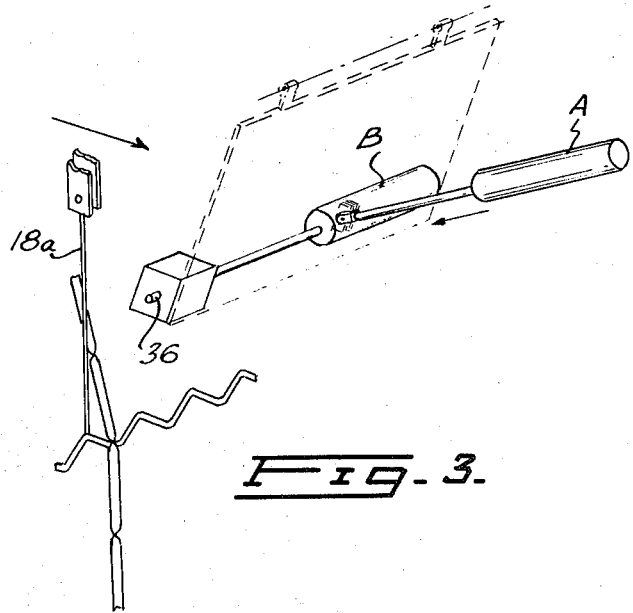
FIGS. 3, 4 and 5 are fragmentary views similar to FIG. 2, showing the parts in various positions during various stages of operation.
Figure 4:
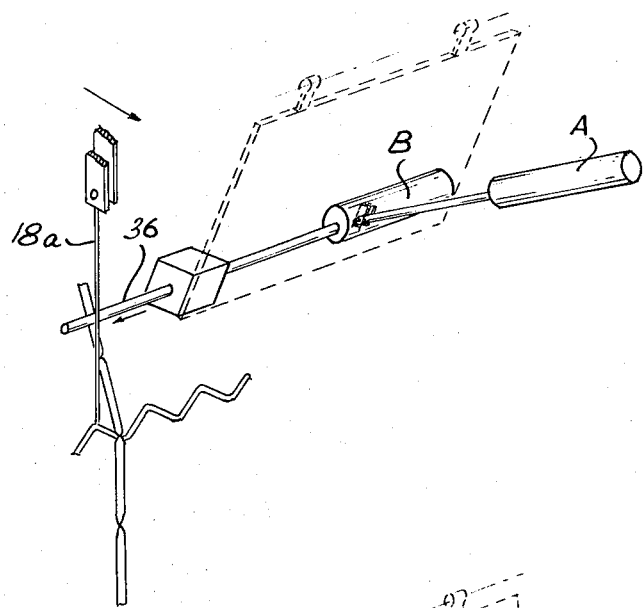
Figure 5:
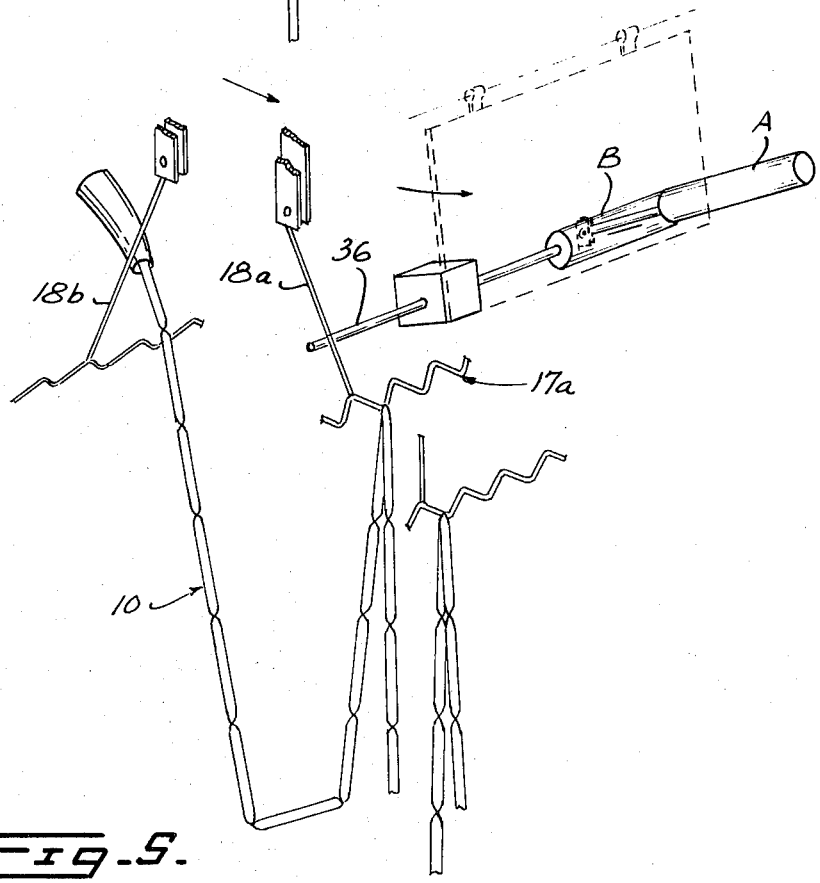

FIG. 3 shows the conditions at the beginning of a cycle with the cylinder A extended and the cylinder B retracted. Upon commencement of a cycle, the cylinder B is extended, as shown in FIG. 4, to project its piston 36 into a position immediately behind, i.e. upstream of, a member 18, e.g. the member 18a. Retraction of cylinder A follows immediately (FIG. 5), causing the piston 36 to swing the member 18a forwardly in advance of its normal travel with the moving conveyor 13. The continued movement of the conveyor will soon permit the member 18a again to assume a vertical orientation, at approximately which time the cylinder B is retracted and the cylinder A extended to return the parts to the initial condition shown in FIG. 3 for similar cooperation with the next vertical member 18b.

DIAGRAMMATIC COMPARISON OF OPERATION OF INVENTION WITH PRIOR ART

Figure 6:
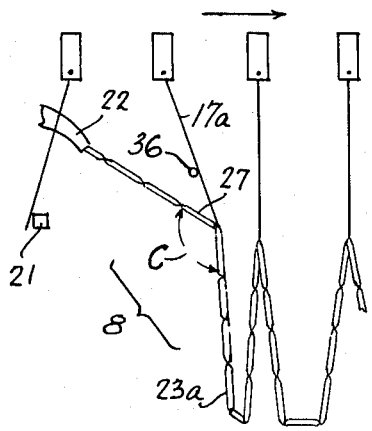
FIGS. 6 to 10 are diagrams demonstrating the operation of the present apparatus (FIGS. 6 and 7) and comparing it with that of the prior art (FIGS. 8 to 10)
Figure 7:
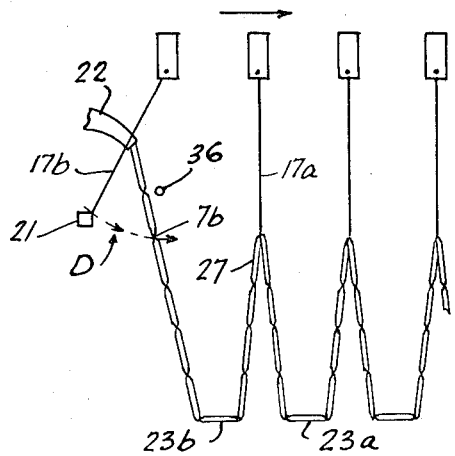
Figure 8:
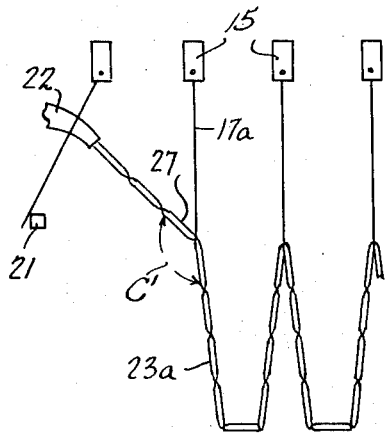
Figure 9:
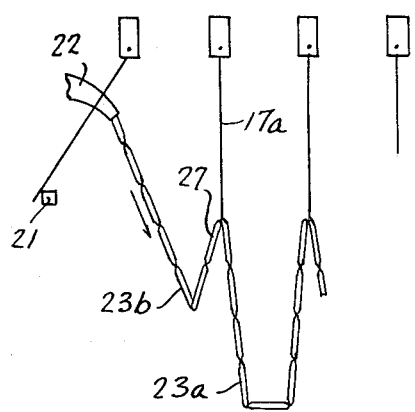
Figure 10:
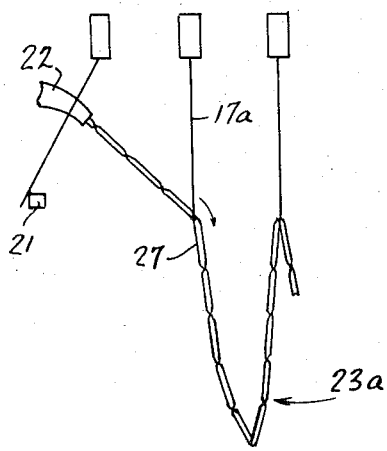

The effect of this action is demonstrated by FIGS. 6 and 7 which compare the operation with that of the prior art machine (FIGS. 8 to 10).

In contrast to the conveyor 13 which travels at a constant speed, the feeding of the sausage chains is discontinuous, being divided into discrete loading cycles. In each loading cycle all the conveyors 11 are driven in synchronism with each other by a motor 25, through a clutch/brake mechanism 26, as is more fully explained below in relation to the control circuit. Each time the conveyors 11 are driven they feed forward a length of chain equal to the desired number of sausages per loop, e.g. nine. FIG. 8 shows conditions in the prior art machine just prior to the feeding of a length of chain. The loop 23a has already been formed, and the next loop 23b (FIG. 9) is just about to be started beyond the T-bar 17a. FIG. 9 shows correct operation. However, should the horizontal member of the T-bar 17a be displaced slightly rearwardly, or should there be some irregularity in the sausage chain, there is a risk that the sausage 27 which should properly form the first sausage of the loop 23b, will slide over into the preceding loop 23a, as demonstrated in FIG. 10, resulting in the loops 23a and 23b containing 10 and eight sausages respectively, instead of the desired nine each.

The present apparatus avoids this risk, as shown in FIG. 6, by pulling forward the T-bar 17a with the piston rod 36 of the tugger device just at the time when downward feeding of a length of the sausage chain commences. The angle C is decreased in comparison with the angle C' in FIG. 8 and is now sufficiently small that, even allowing for some misalignment of or irregularities in the T-bar 17a, the sausage 27 is sure to fall backwardly into the loop 23b, as shown in FIG. 7. FIG. 7 represents conditions somewhat later in the operation, the conveyor 13 having moved forward and the full length of sausage chain required for the loop 23b having been paid out by the conveyor 11. The next T-bar 17b is just on the point of dropping down off the fixed bar 21, in the manner indicated by the broken arrow D, to engage the link 7b and hence complete the loop 23b. The piston 36 has also just been withdrawn, as no longer required, and has been moved back into position in readiness to be extended again to draw the next T-bar 17b forwards after it has dropped down.

CONTROL CIRCUIT (FIG. 11)

The timing of the system will be best understood from the simplified control circuit of FIG. 11.

The cylinders A and B are energised from a valve V either through a line 40 (extending B and retracting A, i.e. tugging) or through a line 41 (retracting B and extending A, i.e. resetting). The valve V is controlled to energise the tugging line 40 by a contact T2 of a timer relay T, and the resetting line 41 by a contact T1 of this relay.

A main relay R1 has normally open contacts R1/1 and R1/2 and normally closed contacts R1/3, and is arranged to be energised by a photocell P. A second relay R2 with normally closed contacts R2/1 is energised by a counter 42 mounted on the shaft 43 of the conveyors 11. The counter 42 closes its contacts momentarily each time the conveyors 11 have been driven sufficiently to pay out the desired length of sausage chains.

The photocell P is mounted on the fixed frame of the apparatus (FIG. 2) to act in conjunction with a lamp L to detect passage of a hanger 15 past a predetermined location. Assuming, as an initial condition, that the relay R1 is deenergised, contacts R1/3 are closed to energise the brake 44 of the clutch/brake assembly 26, and contacts R1/2 are open to deenergize the clutch 45 of this assembly. Thus the conveyors 11 are held stationary. The timer T is energised, however, to close its contact T2 and energise the tugging pneumatic line 40. The parts are thus in the condition of FIG. 6, ready for a new loading cycle to commence. Such cycle is initiated by the photocell P which detects the correct condition of the conveyor 13 to receive the new loop 23b of sausage chain. The cell P energises the relay R1, which is then held closed by its own contacts R1/1. The brake 44 is released by the opening of contacts R1/3, and the clutch 45 is engaged by the closing of contacts R1/2, so that the conveyors 11 start to pay out the chains 10. When the desired length has been paid out the counter 42 detects this fact and energises the relay R2 to release the relay R1 and hence to reapply the brake 44 and release the clutch 45, i.e. the condition of FIG. 7.

When the contacts R1/3 were opened at the commencement of the loading cycle, the timer relay T was released, but a delay built into this device holds the contact T2 closed and the contact T1 open for a short interval, say two seconds, i.e. during the first part of the loading cycle. After this interval, the contact T1 is closed, causing the valve V to energise the resetting line 41 to return the tugger device to its initial condition shown in FIGS. 3 and 7. As already explained, shortly thereafter the counter 42 reenergises the relay R2, i.e. at the end of the loading cycle. In thus releasing the relay R1 the timer relay T is reenergised to cause the tugger device to engage and swing forward the next T-bar, e.g. the T-bar 17b of FIG. 7, soon after it has fallen from the fixed bar 21.

The line of action of the photocell P and lamp L has been shown for convenience in FIG. 2 as adjacent the carrier 33. This is quite possible; it is merely necessary that this cell P detect the position of a representative one of the hangers 15 to indicate that the conveyor is in the correct position to receive a new loop of each sausage chain. The spacing between hangers 15 being fixed, it will often be more satisfactory to arrange the line of action of the lamp/cell assembly a few hangers downstream of the carrier 33 in order to remove such assembly from the spray that will tend to exist in the vicinity of the nozzles 22, water being used to lubricate the travel of the sausage chains along the tubes 12.

I claim:

1. In a conveyor mechanism for transporting a continuous chain of sausage products interconnected by constricted links, said mechanism comprising:

a. a sequence of lugs, and a sequence of supporting devices each comprising a horizontally extending corrugated member having at least one notch for receiving a said link and a vertical member supporting said horizontal member, each vertical member being pivotally supported from one of said lugs;

b. means for continuously moving said lugs and hence said devices along a path of travel with a predetermined spacing between said devices;

c. means defining a loading station for loading a said chain in loops festooned between adjacent pairs of said horizontal members, and d. means located in said path of travel upstream of the loading station for temporarily restraining travel of each horizontal member while the lug associated therewith continues to travel and for subsequently permitting such restrained horizontal member to swing down into the loading station to engage its notch with a link of a generally vertically depending length of said chain whereby to form hanging loops of such chain between successive horizontal members;

the improvement comprising:

e. means for temporarily moving forwardly the horizontal member immediately downstream of the loading station to widen the spacing between such horizontal member and the loading station to facilitate accurate feeding of a loop of said chain between such horizontal member and the next upstream horizontal member, wherein said means (e) comprises:
- f. a first fluid-operated piston and cylinder assembly fixed at one end,
- g. a carrier connected to the other end of said assembly to be movable relative to said loading station,
- h. a second fluid-operated piston and cylinder assembly mounted on said carrier and including a member projectable into the path of travel of each said supporting device, and
- i. means for actuating said fluid-operated assemblies for positioning said projectable member upstream of a said supporting device and subsequently for moving said supporting device forwardly.

2. A conveyor mechanism according to claim 1, wherein said means (c) include means for intermittently feeding a predetermined length of said chain to said loading station, and wherein the conveyor mechanism includes means for actuating said means (e) prior to operation of said feeding means whereby to provide said widened space during downward movement of the chain to form a loop.

* * * * *